United States Patent
Chuang et al.

(10) Patent No.: US 12,182,579 B2
(45) Date of Patent: Dec. 31, 2024

(54) STANDARDIZED AND ROBUST FRAMEWORK TO ENHANCE BOOTLOADER CONFIGURATION MANAGEMENT

(71) Applicant: Quanta Cloud Technology Inc., Taipei (TW)

(72) Inventors: Hsuan-Ho Chuang, Taipei (TW); Tong-Pai Huang, Taipei (TW); Jia-Yu Juang, Taipei (TW); Chia-Jui Lee, Taipei (TW)

(73) Assignee: QUANTA CLOUD TECHNOLOGY INC., Taipei (TW)

( * ) Notice: Subject to any disclaimer, the term of this patent is extended or adjusted under 35 U.S.C. 154(b) by 132 days.

(21) Appl. No.: 17/894,350

(22) Filed: Aug. 24, 2022

(65) Prior Publication Data
US 2024/0069923 A1    Feb. 29, 2024

(51) Int. Cl.
*G06F 9/4401*    (2018.01)
*G06F 9/445*    (2018.01)

(52) U.S. Cl.
CPC ........ *G06F 9/4403* (2013.01); *G06F 9/44505* (2013.01)

(58) Field of Classification Search
CPC ............... G06F 9/44505; G06F 9/4403; G06F 11/0763; G06F 11/0766; G06F 11/1415; G06F 11/2247; G06F 11/2289
See application file for complete search history.

(56) References Cited

U.S. PATENT DOCUMENTS

| | | | |
|---|---|---|---|
| 11,500,646 B1* | 11/2022 | Zhan | G06F 11/0736 |
| 2002/0073304 A1* | 6/2002 | Marsh | G06F 8/65 713/1 |
| 2005/0033954 A1* | 2/2005 | Wang | G06F 11/1417 713/2 |
| 2006/0053272 A1* | 3/2006 | Roth | G06F 9/44505 713/1 |
| 2006/0064578 A1* | 3/2006 | Chandramouleeswaran | G06F 8/656 713/100 |

(Continued)

FOREIGN PATENT DOCUMENTS

CN        112231010 A  *  1/2021  ......... G06F 9/44505

*Primary Examiner* — Hyun Soo Kim
(74) *Attorney, Agent, or Firm* — NIXON PEABODY LLP (57) ABSTRACT

A system includes one or more data processors configured to run a basic input/output system (BIOS) service and a bootloader configuration manager for tuning kernel parameters. The system further includes a non-transitory computer-readable storage medium containing instructions which, when executed on the one or more data processors, cause the one or more data processors to perform operations. The operations include receiving administrative inputs and checking the administrative inputs against a checklist to determine whether any errors are introduced by the administrative inputs. The operations further include writing the administrative inputs to a temporal configuration file in response to no errors being introduced by the administrative inputs. The operations further include exporting the temporal configuration file to a designated output path. The exported temporal configuration file includes kernel parameter settings for configuring a bootloader of a computing device.

20 Claims, 4 Drawing Sheets

(56) References Cited

U.S. PATENT DOCUMENTS

2007/0073978 A1\* 3/2007 Lee ..................... G06F 11/1417
714/E11.135
2015/0254080 A1\* 9/2015 Zhang ..................... G06F 9/441
713/2

\* cited by examiner

STANDARDIZED AND ROBUST FRAMEWORK TO ENHANCE BOOTLOADER CONFIGURATION MANAGEMENT

FIELD OF THE INVENTION

The present invention relates generally to boot management in computing systems, and more specifically, to systems and methods for tuning kernel parameters through a bootloader.

BACKGROUND OF THE INVENTION

Computing systems (e.g., servers, desktop computers, laptop computers, etc.) are used in different contexts for a wide range of functions. Some computing systems operate on batteries and may require low-power operation to conserve charge on the batteries. On the other hand, some computing systems may be plugged into a power outlet, and low-power operation is not as important as computing performance. Many computing systems balance performance and power consumption, even when plugged into a power outlet. No matter what type of computing system is used, the computing system is typically initialized when powered-up. The process of initializing the computing system is called booting. Each computing system can have a different booting sequence or procedure based on the specific hardware components present in the computing system. Typically, computing systems store booting sequences or procedures in non-volatile memory. Included in the booting sequences is typically an initialization of a bootloader. A bootloader is a program that places an operating system of a computing system into the operating memory of the computing system. Administrators can sometimes tune kernel parameters through the bootloader, allowing customizable performance enhancements. Tuning parameters can be cumbersome and can introduce indelible errors that can result in making the computing system unbootable. The present disclosure provides systems and methods for solving problems associated with managing bootloader configurations.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a system includes one or more data processors configured to run a basic input/output system (BIOS) service and a bootloader configuration manager for tuning kernel parameters.

The system further includes a non-transitory computer-readable storage medium containing instructions which, when executed on the one or more data processors, cause the one or more data processors to perform operations. The operations include receiving administrative inputs and checking the administrative inputs against a checklist to determine whether any errors are introduced by the administrative inputs. The operations further include writing the administrative inputs to a temporal configuration file in response to no errors being introduced by the administrative inputs. The operations further include exporting the temporal configuration file to a designated output path. The exported temporal configuration file includes kernel parameter settings for configuring a bootloader of a computing device.

In an implementation, the administrative inputs are included in an env file. In an implementation, the administrative inputs are command line inputs. In an implementation, the administrative inputs include a bootloader configuration manager command, one or more optional arguments, one or more input variables, or any combination thereof. In an implementation, the exporting the temporal configuration file to the designated output path triggers an auto-modification process that modifies a version file. The version file can be organized in sections, with each section having a universal unique identifier as a section name. In an implementation, the sections include a first section and a second section, with the first section and the second section being consecutive sections in the version file. The second section includes modifications made to settings represented by the first section. In an implementation, the exporting the temporal configuration file to the designated output path triggers an auto-modification process that generates a hidden historical file with a universal unique identifier. In an implementation, executing the instructions further causes the one or more data processors to perform operations including overwriting the temporal configuration file with the hidden historical file and exporting the overwritten temporal configuration file to the designated output path. In an implementation, executing the instructions further causes the one or more data processors to perform operations including overwriting the temporal configuration file with a default configuration file and exporting the overwritten temporal configuration file to the designated output path.

In an implementation, executing the instructions further causes the one or more data processors to perform operations including overwriting the temporal configuration file with a default configuration file and exporting the overwritten temporal configuration file to the designated output path. In an implementation, executing the instructions further causes the one or more data processors to perform operations including reducing a size of the temp folder such that the size of the temp folder does not exceed a maximum size. In an implementation, the reducing the size of the temp folder is performed based at least in part on a number of sections in a version file within the temp folder, a life cycle, the maximum size, or any combination thereof. In an implementation, the designated output path is on a remote computing device or a local computing device. In an implementation, the temporal configuration file includes settings for a GRUB2 bootloader.

According to certain aspects of the present disclosure, a method performed by a computing system includes receiving administrative inputs and checking the administrative inputs against a checklist to determine whether any errors are introduced by the administrative inputs. The method further includes writing the administrative inputs to a temporal configuration file in response to no errors being introduced by the administrative inputs. The method further includes exporting the temporal configuration file to a designated output path. The exported temporal configuration file includes kernel parameter settings for configuring a bootloader of a computing device.

In an implementation, the administrative inputs are included in an env file. In an implementation, the administrative inputs are command line inputs. In an implementation, the administrative inputs include a bootloader configuration manager command, one or more optional arguments, one or more input variables, or any combination thereof. In an implementation, the exporting the temporal configuration file to the designated output path triggers an auto-modification process that modifies a version file.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Administrators generally tune kernel command-line parameters and subsequently reboot computing systems to enable the adjustment of kernel command-line parameters through a bootloader. Kernel command-line parameters are adjusted to enhance performance and maximize resource utilization of the computing systems. However, computing systems are complex and various operating systems or firmware within these computing systems can have different output paths, modified files, and executed commands can respectively allow tuning parameters and variables which can conflict with each other. Implementing these variable combinations is complicated, which can lead to human error and result in failure of the computing systems to boot and/or reboot. Embodiments of the present disclosure provide methods and systems for managing bootloader configurations in order to reduce the possibility of human error or some other parameter tuning rendering computing systems inoperable. A standardized and robust framework is provided to allow for version control of booting-related files so that previous versions of the files can be restored when errors are encountered in a current version of the files.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

A bootloader is a critical piece of software responsible for initiating rebooting process. Nowadays, a commonly-used bootloader adopted by Linux distribution is GNU Grand Unified Bootlroader2 (GRUB2). Administrators can configure GRUB2 settings to tune kernel command-line parameters. Linux and GRUB2 are merely used here as an example bootloader for descriptive purposes. Embodiments of the disclosure can be applied to other computing systems and bootloaders (e.g., Windows, macOS, Windows Bootmgr, Windows NTLDR, barebox, boot.efi, BootX, ARM Core bootloader, OpenBIOS, etc.). Furthermore, computing systems can include servers, desktop computers, laptop computers, etc. That is, administrators can configure GRUB2 on a local machine (e.g., a desktop), and/or can configure GRUB2 on a server (e.g., a remote server via a local machine).

Human error in configuring GRUB2 can result in failure of the local machine and/or the server to boot or reboot. For example, when GRUB2 fails to normally load GRUB2 settings (e.g., administrators accidentally delete a white space for configuring GRUB2 settings), administrators will be directed to GRUB2 prompt mode. The reboot process essentially stalls, and the administrators will have an opportunity to execute commands manually to complete the rebooting process. Proper syntax matters in GRUB2 settings, and improper syntax (e.g., an unexpected whitespace) can stall the rebooting process.

In another example, when GRUB2 is unable to find the GRUB2 folder, administrators will be directed to GRUB2 rescue mode. GRUB2 rescue mode is more limited than GRUB2 prompt mode. GRUB2 rescue mode supports different commands than GRUB2 prompt mode. There are no steps in GRUB2 rescue mode to recover steps if an error is made in GRUB2 rescue mode. In GRUB2 rescue mode, once administrators execute a command with any typo, it is impossible to overwrite or undo the previous executed commands. In this case, administrators need to reboot and execute all commands again. Even after troubleshooting in GRUB2 prompt mode and/or GRUB2 rescue mode and successfully rebooting the computing systems, administrators still need to assess GRUB2 settings to discover the error (e.g., an unexpected white space) that stalled the rebooting process. The administrators then need to manually fix the discovered error by re-configuring the GRUB2 settings, and execute commands to save the changes as permanent. In GRUB2, since there is no way to record or track previous changes, administrators cannot revert to a certain version of the kernel command-line parameters settings directly. Hence, configuring kernel command-line parameters and settings each time can lead to difficulty of operation and maintenance.

Figure 1:
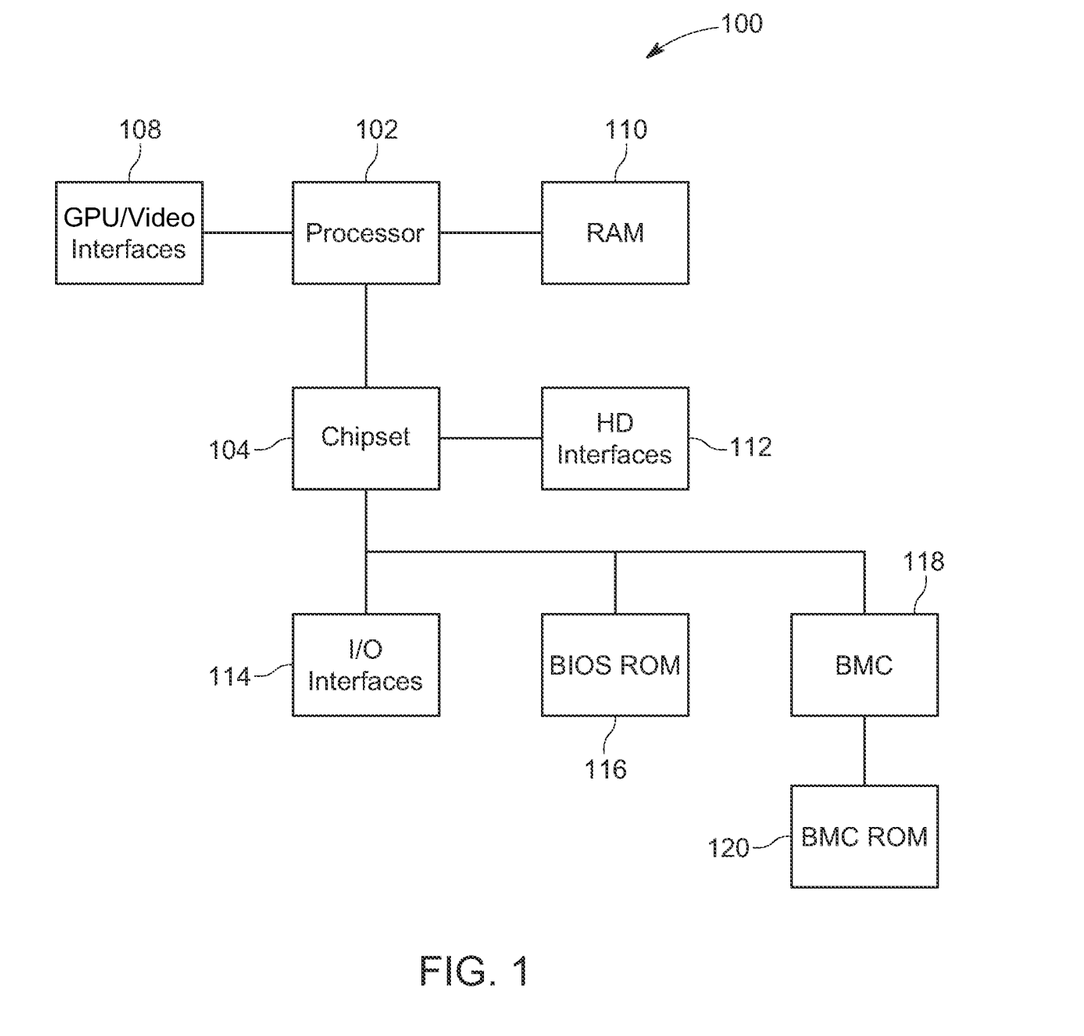
FIG. 1 is a block diagram of a computing system, according to certain aspects of the present disclosure.

Referring to FIG. 1, a block diagram of a computing system 100 is provided. Examples of the computing system 100 include a server, a laptop, a desktop computer, a smartphone, etc. The computing system 100 includes a processor 102, graphics processing unit (GPU)/video interfaces 108, a chipset 104, random access memory (RAM) modules 110, input/output (I/O) interfaces 114, hard disk (HD) interfaces 112, a BIOS read only memory (ROM) 116, a BMC 118, and a BMC ROM 120. Each of the components provided in FIG. 1 can be provided on a circuit board of the computing system 100. The circuit board can be a printed circuit board (PCB) that serves as a communications backbone for all components and external peripherals that connect to the computing system 100. In some examples, the circuit board is a motherboard that includes copper connecting traces and copper planes for power and signal isolation.

Although indicated as singular in FIG. 1, the processor 104 can be one or more processors (e.g., one processor, two processors, three processors, etc.). The processor 104 can include CPUs and GPUs. In some implementations, GPUs are separated from CPUs and communicate with CPUs via the one or more I/O interfaces 114 or the one or more GPU/video interfaces 108. For example, the I/O interfaces 114 include peripheral component interconnect express (PCIe) slots for receiving GPUs, and the CPUs can manage initialization and operation of the GPUs via the PCIe bus standard. The GPUs are coupled to video interfaces that enables viewing of information on monitors or screens.

The RAM modules 110 can include dual inline memory modules (DIMMs) of double data rate synchronous dynamic random access memory (DDR SDRAM). The RAM modules 110 are high speed volatile memory modules that serve as main memory for the processor 102. The main memory for the processor 102 is used when cache memory or register memory of the processor 102 does not include information that the processor 102 needs. The RAM modules 110 are higher capacity memory when compared to the cache memory or register memory of the processor 102.

The BIOS ROM 116 and the BMC ROM 120 are provided in order to facilitate initialization of components of the computing system 100. The BIOS ROM 116 can be a BIOS non-volatile memory (e.g., a flash memory) including instructions, settings, and/or configurations for the processor 102 (e.g., a CPU) to booting both the BIOS program that initializes components of the computing system 100. Similarly, the BMC ROM 120 can be a non-volatile memory including instructions, settings, and/or configurations for the BMC 118 to initialize the computing system 100. In some implementations, the BIOS ROM 116 and the BMC ROM 120 are serial peripheral interface (SPI) flash memories.

The BIOS ROM 116 contains a BIOS image. The BIOS image is a configuration file that includes instructions for basic setup of the computing system 100. The BIOS image includes a power-on self-test (POST) function, a bootloader (i.e., a bootstrap loader function), load BIOS drivers function, and/or BIOS configuration setup. The POST function is an initial test of computer hardware to ensure errors do not exist before loading of an operating system of the computing system 100. The bootstrap loader function locates the operating system on the computing system 100, and in some implementations, can pass control to the operating system once the BIOS setup is complete. The load BIOS drivers function involves executing low-level drivers to provide basic operational control over some hardware components of the computing system 100. In some cases, these hardware components include peripheral devices like mice, keyboards, or other input devices. The BIOS configuration setup is a program that allows configuring hardware settings (e.g., date and time). The BMC ROM 120 includes a BMC image. The BMC image includes an embedded operating system, an application for management function, space configurations concerning saving BMC log and configuration data, etc. The BMC image facilitates booting the BMC 118.

The BMC 118 is a specialized controller (or processor) for managing operations of the computing system 100. In some implementations, the BMC 118 enables remote monitoring of the computing system 100, having communication channels to different components of the computing system 100. For example, the BMC 118 can allow remote monitoring of fan speeds, temperature sensors, hard drive faults, power supply failures, operating system faults, etc. The BMC 118 can include internal temporary cache memory that facilitates the BMC 118 processing of machine readable instructions. Example BMCs include ASPEED AST2300, AST2400, AST2500, AST2600, etc.

In some implementations, the BMC 118 is connected to various general purpose input/output (GPIO) pins. For example, the BMC 118 can be connected to a first GPIO pin for a system reset (e.g., an input that resets the computing system 100). The BMC 118 can be connected to a second GPIO pin for a chipset reset (e.g., an output that resets and initiates booting from the BIOS image). The BMC 118 can be connected to a third GPIO pin for power on (i.e., an input pin for turning on the computing system 100). The BMC 118 can be connected to a fourth GPIO pin for a power controller to manage power provision to different parts of the computing system 100. By routing power on and system reset signals through the BMC 118, the BMC 118 can capture these inputs, using them to control behavior of the computing system 100 when the computing system 100 is powered on or reset.

The one or more I/O interfaces 114 can include serial AT attachment (SATA) ports to connect bus adapters to storage devices such as hard disk drives, solid state drives, optical drives, etc. The I/O interfaces 114 can include more PCI or PCIe ports for receiving cards such as Ethernet cards, Wi-Fi cards, Bluetooth cards, sound cards, etc. The I/O interfaces 114 can include universal serial bus (USB) ports to connect peripheral devices or mass storage devices.

The chipset 104 is a chip that is directly connected to the processor and provides access to components that communicate at a slower speed compared to the other components connected to the processor 102 (e.g., the GPU/video interfaces 108 and the RAM modules 110). For example, the chipset 104 can connect the HD interfaces 112, the I/O interfaces 114, the BIOS ROM 116, the BMC 118, etc. The HD interfaces 212 can include serial advanced technology attachment (SATA), integrated drive electronics (IDE), peripheral component interconnect (PCI) interface, etc.

During Power On Self-Test (POST) stage of a booting process of a computing system (e.g., the computing system 100), the host firmware such as BIOS sends system configuration and inventory to the BMC 118. BIOS here indicates the program stored in the BIOS ROM 116 that is run on the processor 102 to initialize the computing system 100. By having the BMC 118 receive system configuration and inventory from the host firmware, a user of the computing system 100 is able to obtain system configuration and inventory remotely. Remote access to system configuration and inventory indicates that the user is able to configure system settings remotely. During runtime, the BIOS can record a system event log (SEL) to the BMC ROM 120 if any error detected. In order to perform this task, the BIOS relies on low-speed interfaces or protocols such as Intelligent Platform Management Interface (IPMI) Keyboard Control Style (KCS) running on enhanced SPI (eSPI) or low pin count (LPC) interface to communicate with the BMC 116.

The bootloader is typically stored in a first block of a bootable medium (e.g., a hard disk connected to the HD interfaces 112, a CD or DVD in a media player connected to the I/O interfaces 114, a removable media connected to the I/O interfaces 114, etc.). The bootloader, in some implementations, can be found on a specific partition of the bootable medium. The bootloader, once initialized by the BIOS, loads the kernel of the operating system of the computing system 100. The bootloader also processes different routine tasks and commands such as integrating data storage, identifying and starting other available bootloaders, launching application programs directly prior to loading the operating system, correcting or expanding missing functions and entries in the BIOS, etc. Once the bootloader function is completed, the bootloader returns the system responsibility to the kernel.

Figure 2:
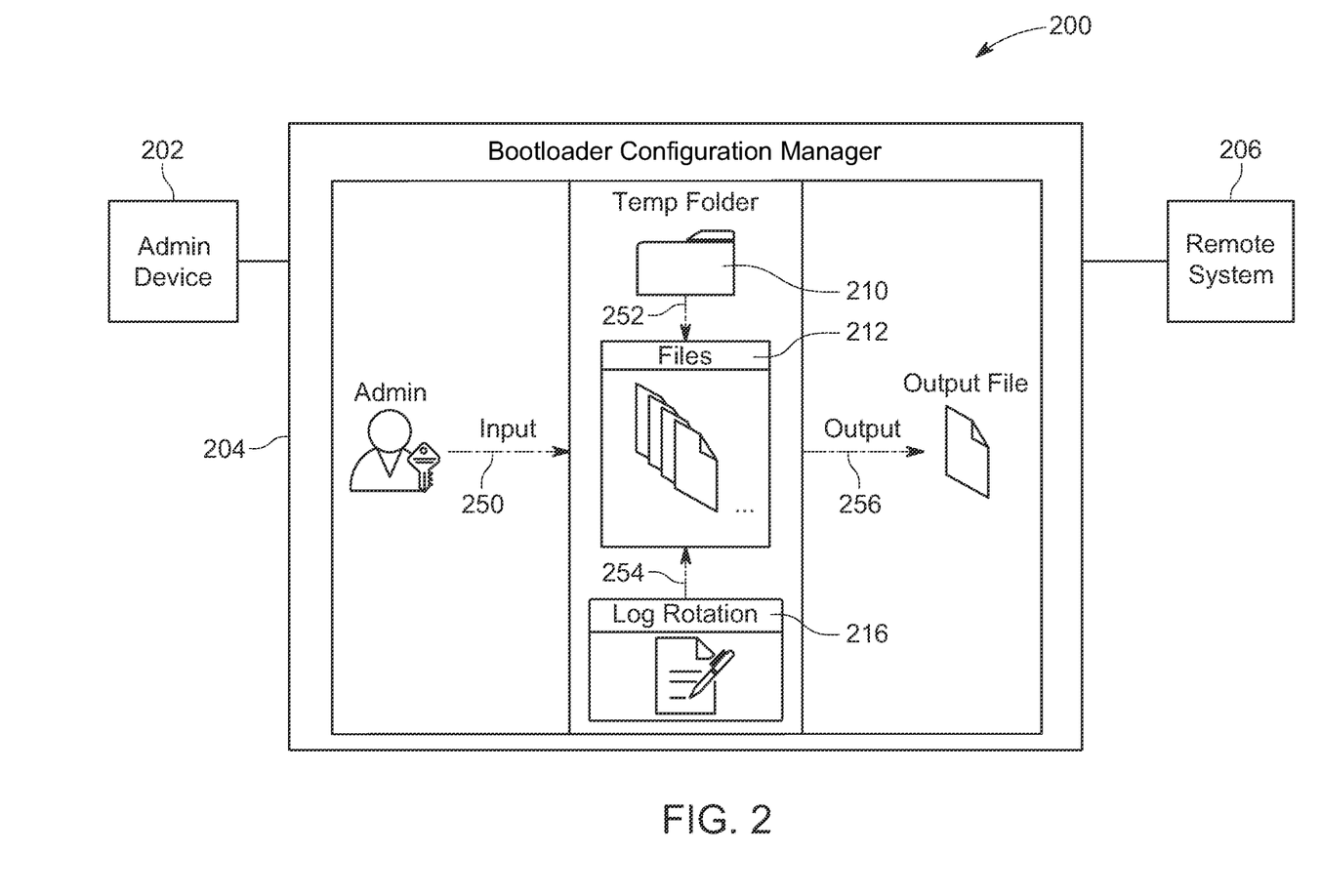
FIG. 2 is a block diagram for tuning bootloader parameters, according to certain aspects of the present disclosure.

With the aforementioned tasks associated with the bootloader, administrators are able to configure the kernel of the operating system by tuning parameters. The kernel typically provides a command-line for user-interaction (i.e., an administrator level interaction). Embodiments of the present disclosure provide a framework with a bootloader configuration manager to simplify and unify the process of kernel command-line parameter tuning. Some embodiments are described using GRUB2 bootloader such that the bootloader configuration manager is used to manage GRUB2 settings. Referring to FIG. 2, a block diagram for a system 200 for tuning bootloader parameters is provided, according to certain aspects of the present disclosure. The system 200 may include an admin device 202, a bootloader configuration manager 204, and a remote system 206. In some implementations, the bootloader configuration manager 204 is included in the admin device 202, while in some implementations, the bootloader configuration manager 202 is included in the remote system 206. In some implementations, the bootloader configuration manager 204 is a separate server from both the admin device 202 and the remote system 206. The admin device 202 and the remote system 206 are computing systems (e.g., similar to or the same as the computing system 100). For example, the admin device 202 can be a laptop computer or a desktop computer that the administrator uses to remotely configure the remote system 206. Although indicated as singular, each of the admin device 202 and the remote system 206 can include more than one device. For example, a single administrator working on the admin device 202 can configure multiple remote servers (i.e., the remote system 206). In some implementations, the administrator is configuring a local machine (i.e., the admin device 202). In some implementations, multiple administrators working on different devices are configuring different parameters on multiple remote servers (i.e., the remote system 206). These combinations are merely provided as non-limiting examples.

Since the bootloader configuration manager 204 can be located on the admin device 202, the remote system 206, or some other remote server, the bootloader configuration manager 204 is shown as a standalone with various steps provided. In some implementations, the bootloader configuration manager 204 is a command line interface developed based on Linux relevant commands that can be provided on a Linux Standard Base system. The bootloader configuration manager 204 can help administrators configure GRUB2 settings more easily. The bootloader configuration manager 204 provides a fool-proof mechanism to prevent typos or unintentionally repeated kernel command-line parameters. Furthermore, with a version control mechanism, administrators can easily restore a specified GRUB2 setting. The bootloader configuration manager thus reduces the possibility of rebooting failure caused by human errors so that administrators can focus on server and/or application operation and deployment.

The bootloader configuration manager 204 receives administrative inputs from the admin device 202 as indicated by input 250. The admin device 202 can input the following to the bootloader configuration manager 204: (i) a bootloader configuration manager command, (ii) one or more optional arguments, and/or (iii) one or more input variables. The bootloader configuration manager command includes commands for editing behavior and version control of the GRUB2 settings. Examples of bootloader configuration manager commands include SET, SHOW, GET, COMMIT, RESET, and RESTORE. The SET command is used to provide values for input variables. The GET command is used to display values of specific configuration settings. The SHOW command is used to display the entirety of a temporal bootloader configuration file. The COMMIT command is used to export the temporal bootloader configuration file to an output file. The RESET command is used to restore bootloader configuration settings to default settings. The RESTORE command is used to restore bootloader configuration settings to historical previous settings. These commands are merely provided as examples. Other commands may be written to enhance the bootloader configuration manager 204.

The one or more optional arguments include arguments that are used to enhance the bootloader configuration manager commands. For example, arguments include an Update argument, an Append argument, a Force argument, a LogRotation argument, a VersionList argument, etc. The Update argument allows updating values of a specific input variable. The Append argument provides a means of setting a same input variable with different values. The Force argument is used with the SET command to export the temporal bootloader configuration file. The LogRotation argument is used to set conditions for managing a size of a folder containing version files that facilitate management of different versions of bootloader configuration settings. The LogRotation argument allows deleting older version files in order to manage the size of the folder containing the version files. The VersionList argument is used to display historical logs of previous settings.

The admin device 202 can modify multiple parameters via the command line by listing the variables one at a time or using an env file. For example, an env file is provided below where each line of the env file represents a kernel command line parameter. That is, the env file includes six kernel command line parameters— console=tty1, test123abc, default_hugepagesz=1G, hugepagesz=1G, hugepages=20, and rw. "test123abc" is an example of an unsupported parameter that is meant to trigger the fool-proof mechanism provided by the bootloader configuration manager 204, according to some implementations of the present disclosure. The description so far familiarizes with different ways of entering parameters, but the effect of having an unsupported parameter will be discussed later.

| ENV file example (env.example) |
|---|
| console=tty1<br>test123abc<br>default_hugepagesz=1G<br>hugepagesz=1G<br>hugepages=20<br>rw |

At the command line, the SET command of the bootloader configuration manager 204 can refer to the "env.example" file that contains the kernel command line parameters to be changed. Example syntax is provided below.

| Applying Multiple Inputs via an ENV file |
|---|
| [root@localhost blc-manager]# ./blc-manager --set env.example |

In some implementations, at the command line, the SET command of the bootloader configuration manager 204 can set each of the kernel command line parameters listed. An env file does not have to be used. Example syntax is provided below.

| Applying Multiple Inputs via the<br>Command Line Using SET command |
|---|
| [root@localhost blc-manager]# ./blc-manager --set console=tty1<br>test123abc<br>default_hugepagesz=1G hugepagesz=1G hugepages=20 rw |

The one or more input variables are kernel command-line parameters that are written into a temporal bootloader configuration file (i.e., a temporal GRUB2 configuration file). In some implementations, when an unsupported parameter is encountered, the unsupported parameter triggers the fool-proof mechanism by implementing the SET command to prevent the string (i.e., the unwritten parameter) from being written to the temporal bootloader configuration file. Furthermore, an error message can be raised once the unsupported parameter is encountered.

At a first adoption or run of the bootloader configuration manager 204, a Temp Folder 210 is generated. In some implementations, the Temp Folder 210 is stored in storage of a local machine where the bootloader configuration manager 204 is located (e.g., the admin device 202). In some implementations, the Temp Folder 210 is stored in a remote machine or on cloud storage. In some implementations, the bootloader configuration manager 204 automatically generates a hidden folder ".blc_mgr" under the administrator's home directory of the target server(s) (i.e. the admin device 202 and/or the remote system 206). The bootloader configuration manager 204 then creates the Temp Folder 210 under the hidden folder ".blc_mgr" (i.e. /root/.blc_mgr/Temp-Folder). If the ".blc_mgr" already exists in the administrator's home directory, the bootloader configuration manager 204 can create the Temp Folder 210 directly in ".blc_mgr" directory. The ".blc_mgr" hidden folder naming convention is provided as an example.

The aforementioned method may require administrators to be responsible for data management (i.e., the Temp Folder 210 and Files 212 contained in the Temp Folder 210). If there are different data management requirements, administrators can also mount cloud storage services or Network File Systems in the administrators' home directory. The mounted Network File System or storage service can be named ".blc_mgr" to ensure data persistence. Administrators can apply storage tools and/or policies for data management on the Network File System or storage service.

After creating the Temp Folder 210, the bootloader configuration manager 204 performs initialization to scan and store information to the Files 212. The stored information can include an operating system version, a firmware version, a BIOS version, and other system information. The Temp Folder 210 includes the Files 212. Examples of the Files 212 include: (i) version files, (ii) temporal GRUB2 configuration files, and/or (iii) a checklist. The version files are files used for version control of GRUB2 settings. The temporal GRUB2 configuration files are files that are modified for changing behavior of the GRUB2 bootloader and/or the kernel parameters.

The checklist is a file used for implementing the fool-proof mechanism. The checklist includes the stored information (e.g., operating system version, firmware version, etc.) and supported kernel command-line parameters. The supported kernel command-line parameters can be scraped from kernel documentation (e.g., version v4.14) released on the website operated by the Linux Kernel Organization. That is, as kernel updates are made, the command-line parameters can be modified over time, so a newer kernel commands may be incompatible with older kernel commands; or newer kernel commands may not exist in older kernel commands and vice versa. The checklist verifies that there is at least compatibility with the commands being used. The fool-proof mechanism involves input variables being compared with the checklist whenever the temporal GRUB2 configuration files are edited or whenever a version control occurs. That is, the comparison ensures that every edit to the temporal GRUB2 configuration files involves inputting variables that are defined in the checklist and that have not yet been set. A pass criterion for the fool-proof mechanism is required before the bootloader configuration manager 204 accepts and executes any edits made to the temporal GRUB2 configuration files.

| Example Checklist File |
|---|
| [System-Information]<br>OS="CentOS Linux 8 (Core)"<br>FW="UEFI"<br>Kernel="Linux 4.18.0-193.el8.x86_64" |

-continued

Example Checklist File

```
Arc="x86-64"
Chassis="vm"
...
[Kernel-Command-Line-Parameters]
acpi
acpi_acpic_instance
acpi_backlight
acpi_force_32bit fadt_addr
...
```

In an example, the checklist file can be organized as having a first section that provides system information like operating system "OS" indicated as a Linux operating system, firmware "FW" indicated as UEFI, kernel version indicated under "Kernel", processor architecture "Arc" indicated as "x86-64" and chassis indicated as a virtual chassis "vm." Other system information can be included in the checklist file and the above are merely provided as examples. The checklist can also have a second section that provides kernel command line parameters. In the example above, sample advanced configuration and power interface (ACPI) parameters are listed. The parameters in the kernel command line parameters section of the checklist file can be listed in alphabetical order to facilitate searching and comparing the kernel command line parameters with the input variables from the administrator for the fool-proof mechanism.

Figure 3:
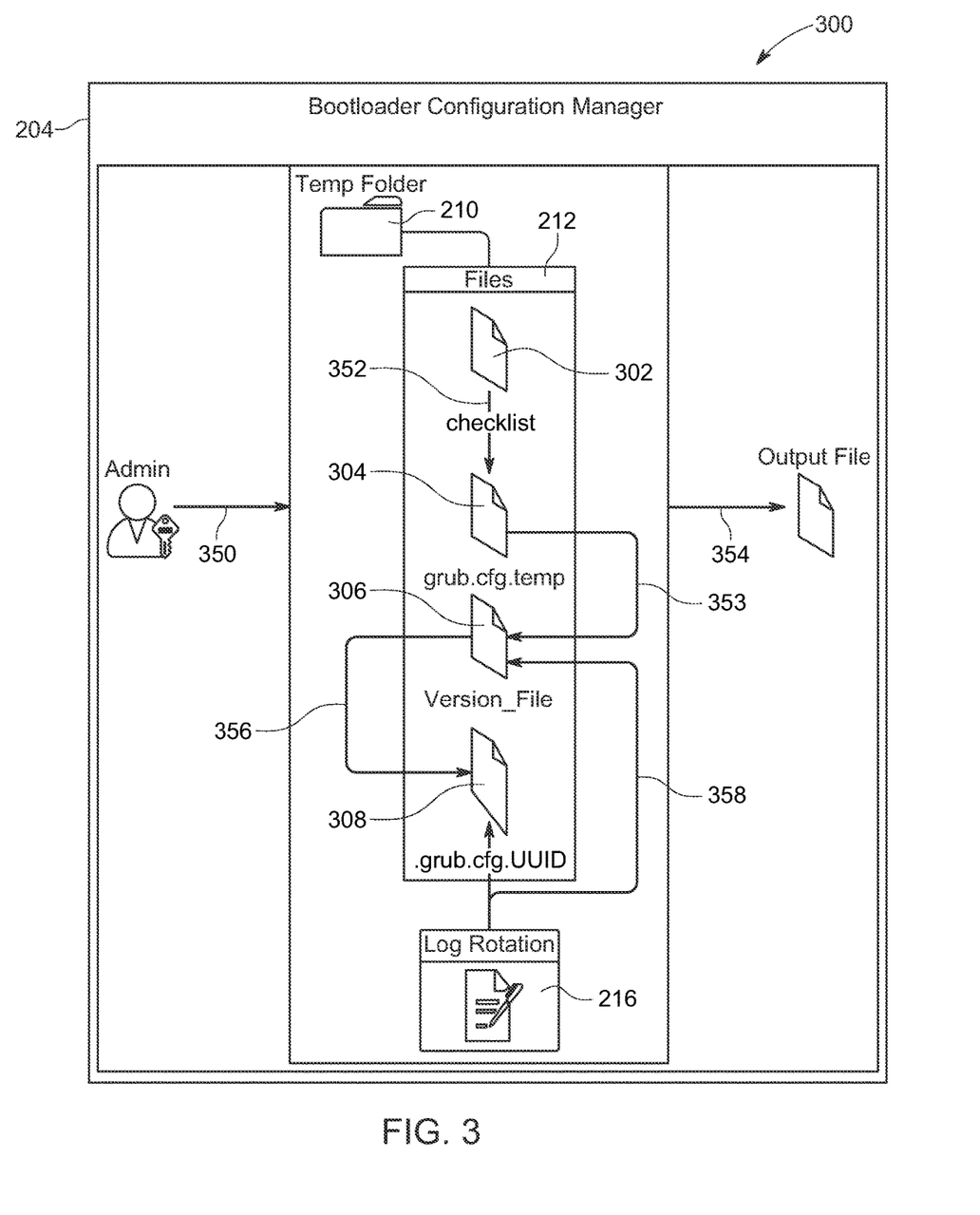
FIG. 3 illustrates information flow for tuning bootloader parameters, according to certain aspects of the present disclosure.

The log rotation 216 manages the size of the Temp Folder 210 by deleting older version files. For example, a maximum size of the Temp Folder 210 can be set to 1 MB, and the log rotation 216 automatically deletes older version files to maintain the size of the Temp Folder 210 under 1 MB. In another example, the log rotation 216 combines temporal characteristics along with the size of the Temp Folder 210 to ensure that the maximum size of the Temp Folder 210 is not exceeded. For example, by default, the log rotation 216 can be configured to only keep version files (i.e., hidden historical files 308 of FIG. 3 and correspondent sections in the version file 306 of FIG. 3) generated within a month if the size of the Temp Folder 210 becomes larger than 1 MB. Each executed COMMIT command or FORCE argument with SET command can generate a section in the version file 306 (FIG. 3). And if the total size of version files within a month is larger than 1 MB, the bootloader configuration manager 204 only keeps a specified number of version files. In some implementations, the specified number is 120 version files. An arrow 254 is provided to indicate that the log rotation 216 operates on the Files 212, and an arrow 252 is provided to indicate that the Temp Folder 210 includes the Files 212.

Referring to arrow 256, after completing the configuration of GRUB2 settings, administrators using the admin device 202 can export the temporal GRUB2 configuration file to the designated output path. In some implementations, administrators can use the COMMIT command to export the temporal GRUB2 configuration file to the designated output path. In some implementations, the administrators can use the Force argument with SET command to export the temporal GRUB2 configuration file to the designated output path. The output file created is exported based on the information (e.g., OS/firmware version) from the checklist.

FIG. 3 illustrates information flow 300 for tuning bootloader parameters of the bootloader configuration manager 204, according to certain aspects of the present disclosure. Input 350 indicates that the bootloader configuration manager 204 receives one or more commands from an administrator (e.g., a SET, SHOW, and/or GET command) with several optional arguments for configuring GRUB2 settings. GET command is typically used to display value of input variables, and SHOW command is typically used to display the entirety of the temporal GRUB2 configuration file. Input 350 is similar to or the same as the input 250 indication of FIG. 2.

As discussed above in connection with FIG. 2, the Files 212 includes a checklist 302. After the input 350 passes the fool-proof mechanism check against the checklist 302, arrow 352 indicates that the checked input variables are then directly added to a temporal GRUB2 configuration file 304 (i.e., grub.cfg.temp). In some implementations, when administrators set up an input variable with a null value, the bootloader configuration manager 204 will delete the input variable from the temporal GRUB2 configuration file 304. In some implementations, when choosing to update existing kernel command-line parameters, administrators can utilize an Update argument with the SET command to avoid errors raised by the fool-proof mechanism. Update argument merely updates existing kernel command-line parameters. Furthermore, when setting the same input variable with different values (e.g., specifying multiple devices for console output), administrators can use an Append argument to append the input variable and then execute the SHOW command to capture and display the current settings of the temporal GRUB2 configuration file 304. When capturing and displaying a certain kernel command-line parameter, administrators can apply the GET command.

As indicated by arrow 354, the temporal GRUB2 configuration file 304 can be exported to a designated output path (i.e., provided as an Output File for booting into the OS). For exporting purposes, administrators can execute either the COMMIT command or Force argument with SET command to permanently save changes based on the information stored in the checklist. Simultaneously, using the COMMIT command or Force argument with SET command triggers an auto-modification process to modify a version file 306 (i.e., Version_File). The auto-modification process appends a section to the version file 306 and labels the section with a universal unique identifier (UUID) as its section name. Changes to the section made by the administrators are only saved in the temporal GRUB2 configuration file 304. Any changes committed are compared to the last committed results to determine changes from one version to another. A first committed change when previous versions do not exist are compared to the default GRUB2 settings. The example below illustrates this process.

Example Version_File

```
[b4fab348-a6a5-4ebe-bef3-78958b6bd7d8]
+| console=tty1 default_hugepagesz=1G hugepagesz=1G hugepages=20
[41e1870b-5ead-44c2-a555-a644c994e479]
-| console=tty1
+| console=tty2
```

In the example Version_File, there are two sections, a first section with UUID "b4fab348-a6a5-4ebe-bef3-78958b6bd7d8" and a second section with UUID "41e1870b-5ead-44c2-a555-a644c994e479." To generate the Version_File example, a second COMMIT command must have followed a first COMMIT command at some point in time. The first COMMIT command triggers creation of the first section, and the second COMMIT command triggers creation of the second section. When the first COMMIT command changes occur, these changes are utilized to compare with default GRUB2 settings. Here, kernel command-line parameters are added to grub.cfg.temp and export grub.cfg.temp to the designated output path. Meanwhile, the version control mechanism is automatically triggered to generate the first section. The first section shows that the difference between the default GRUB2 settings and the exported output file has to do with the "console" line. That is, "console=tty 1 default_hugepagesz=1G hugepagesz=1G hugepages=20" is different. The second COMMIT command triggers generating the second section. The second section shows that the difference between the first section and the second section has to do with the "console" parameter. That is, "console=tty 1" is removed and "console=tty2" is added. The value "console" parameter changed between the first COMMIT command the second COMMIT command from "tty1" to "tty2."

As indicated by arrow 356, the bootloader configuration manager 204 then generates a hidden historical file 308 (i.e., .grub.cfg.UUID) based on the version file 306 (i.e., Version_File) for version control. In some implementations, the hidden historical file 308 is read-only once generated to prevent unauthorized modification.

Each commit change in editing behavior triggers log rotation 216 to limit the size of Temp Folder 210. Administrators can modify log rotation conditions by utilizing LogRotation argument with the SET command. Variables for modifying the LogRotation argument are maximum size (e.g., in bytes) of the Temp Folder 210, life cycle (e.g., in days) indicating duration of version files, and the number of sections in the version file 306.

The life cycle is the value set to indicate the duration that version files (i.e., the hidden historical file 308 and correspondent sections in the version file 306) are kept starting from the time of creation. The log rotation 216 is triggered only when changes are permanently saved. After the log rotation 216 is triggered, the log rotation 216 checks the size of the Temp Folder 210. If the size of the Temp Folder 210 does not exceed, for example, 1 MB, the version files created within one month will be kept. Here, maximum size is 1 MB. However, when administrators intend to keep version files within merely seven days, administrators can adjust the life cycle to change the duration from one month to seven days. When the creation time of version files is within the life cycle but the size of the Temp Folder 210 exceeds 1 MB, the latest 120 sections version files (i.e., the version file 306 and the hidden historical file 308) by default will be kept.

Figure 4:
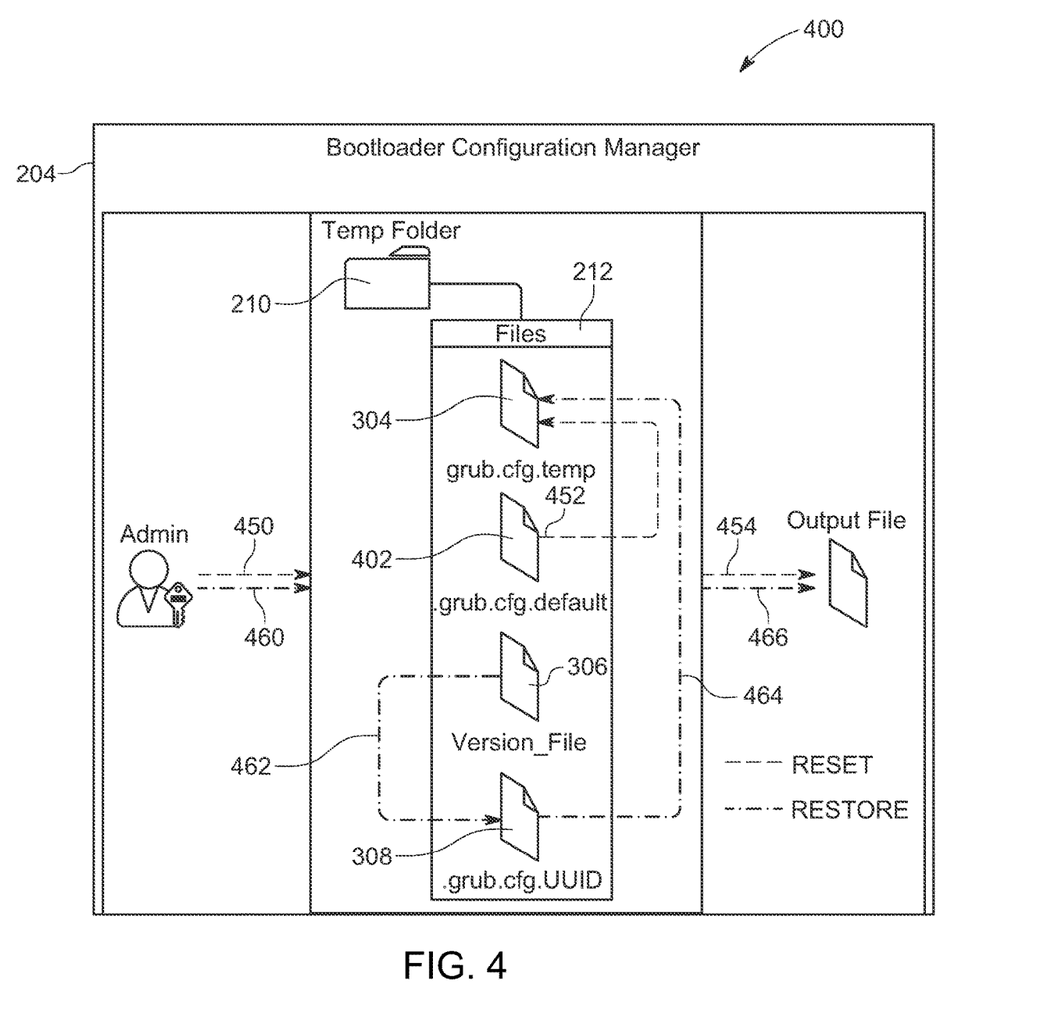
FIG. 4 illustrates information flow for tuning bootloader parameters, according to certain aspects of the present disclosure.

FIG. 4 illustrates information flow 400 for tuning bootloader parameters using the bootloader configuration manager 204, according to certain aspects of the present disclosure. To implement version control, administrators can either execute a RESET command or a RESTORE command. The RESET command restores GRUB2 settings to the default GRUB2 settings. The RESTORE command restores GRUB2 settings to a specified version. In some implementations, neither the RESET command nor the RESTORE command is traceable, since the log rotation 216 (FIG. 3) is not triggered and the version file 306 (e.g., the Version_File) is not updated.

FIG. 4 illustrates information flow for both the RESET command and the RESTORE command. Regarding RESET, administrators can execute the RESET command 450 to restore the GRUB2 settings to the default version. The RESET command 450 can be provided by the admin device 202 (FIG. 2).

Arrow 452 indicates that the bootloader configuration manager 204 reads a temporal hidden file 402 (i.e., .grub.cfg.default) and overwrites the temporal GRUB2 configuration file 304 (i.e., grub.cfg.temp). It is noted that the temporal hidden file 402 (in this example, .grub.cfg.default) stores the default GRUB2 settings generated when the bootloader configuration manager 204 was first initialized.

Arrow 454 indicates that after overwriting the temporal GRUB2 configuration file 304, the bootloader configuration manager 204 automatically triggers the COMMIT command to output the changes.

Regarding RESET, administrators can execute the RESTORE command with a VersionList argument to capture and display historical logs (i.e., sections and their UUIDs) from the version file 306 (i.e., Version_File). Administrators adopt the input variable, UUID, with RESTORE command 460 to restore GRUB2 settings to a specified version.

Arrow 462 indicates that the bootloader configuration manager 204 then searches and reads the hidden historical file 308 (i.e., .grub.cfg.UUID).

Arrow 464 indicates that the bootloader configuration manager 204 adopts the contents of the hidden historical file 308 (i.e., .grub.cfg.UUID) to overwrite the temporal GRUB2 configuration file 304 (i.e., grub.cfg.temp).

Arrow 466 indicates that after overwriting, the bootloader configuration manager 204 automatically triggers the COMMIT command to output the changes.

Embodiments of the present disclosure provide several advantages. For example, SHOW and GET commands are provided for displaying contents of the temporal GRUB2 configuration file (i.e., grub.cfg.temp). Using Log Rotation, the Temp Folder is not deleted but only older previous versions are deleted. An administrator needs to delete the Temp Folder manually before the bootloader configuration manager 204 is re-initialized. Furthermore, operations of RESET and RESTORE are not recorded in the version file since the content of grub.cfg.temp already exists in the latest .grub.cfg.UUID file before being overwritten. Embodiments of the disclosure provide version control and ability to revert to past versions in the event of any errors. Furthermore by providing a historical file (.grub.cfg.UUID) or a default file (.grub.cfg.default) for overwriting the grub.cfg.temp file when a RESET or RESTORE is performed allows that only the grub.cfg.temp file is exported to the output. This procedure of always exporting the grub.cfg.temp file and not another file provides consistency in process and reduces any changes of unexpected results if multiple files were allowed to be exported to the output.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments.

Rather, the scope of the disclosure should be defined in accordance with the following claims and their equivalents.

What is claimed is:

1. A system comprising:
   one or more data processors configured to run a basic input/output system (BIOS) service and a bootloader configuration manager for tuning kernel parameters; and
   a non-transitory computer-readable storage medium containing instructions which, when executed on the one or more data processors, cause the one or more data processors to perform operations including:
      receiving administrative inputs,
      checking the administrative inputs against a checklist to determine whether any errors are introduced by the administrative inputs,
      writing the administrative inputs to a temporal configuration file in response to no errors being introduced by the administrative inputs,
      creating a temp folder including the checklist and the temporal configuration file, and
      exporting the temporal configuration file to a designated output path, the exported temporal configuration file including kernel parameter settings for configuring a bootloader of a computing device.

2. The system of claim 1, wherein the administrative inputs are included in an env file.

3. The system of claim 1, wherein the administrative inputs are command line inputs.

4. The system of claim 1, wherein the administrative inputs include a bootloader configuration manager command, one or more optional arguments, one or more input variables, or any combination thereof.

5. The system of claim 1, wherein the exporting the temporal configuration file to the designated output path triggers an auto-modification process that modifies a version file.

6. The system of claim 5, wherein the version file is organized in sections, with each section having a universal unique identifier as a section name.

7. The system of claim 6, wherein the sections include a first section and a second section, the first section and the second section being consecutive sections in the version file, the second section including modifications made to settings represented by the first section.

8. The system of claim 6, wherein the exporting the temporal configuration file to the designated output path triggers an auto-modification process that generates a hidden historical file with a universal unique identifier.

9. The system of claim 8, wherein executing the instructions further causes the one or more data processors to perform operations including overwriting the temporal configuration file with the hidden historical file and exporting the overwritten temporal configuration file to the designated output path.

10. The system of claim 8, wherein executing the instructions further causes the one or more data processors to perform operations including overwriting the temporal configuration file with a default configuration file and exporting the overwritten temporal configuration file to the designated output path.

11. The system of claim 1, wherein executing the instructions further causes the one or more data processors to perform operations including reducing a size of the temp folder such that the size of the temp folder does not exceed a maximum size.

12. The system of claim 11, wherein the reducing the size of the temp folder is performed based at least in part on a number of sections in a version file within the temp folder, a life cycle, the maximum size, or any combination thereof.

13. The system of claim 1, wherein the designated output path is on a remote computing device or a local computing device.

14. The system of claim 1, wherein the temporal configuration file includes settings for a GRUB2 bootloader.

15. A method performed by a computing system, the method comprising:
   receiving administrative inputs;
   checking the administrative inputs against a checklist to determine whether any errors are introduced by the administrative inputs;
   writing the administrative inputs to a temporal configuration file in response to no errors being introduced by the administrative inputs;
   creating a temp folder including the checklist and the temporal configuration file; and
   exporting the temporal configuration file to a designated output path, the exported temporal configuration file including kernel parameter settings for configuring a bootloader of a computing device.

16. The method of claim 15, wherein the administrative inputs are included in an env file.

17. The method of claim 15, wherein the administrative inputs are command line inputs.

18. The method of claim 15, wherein the administrative inputs include a bootloader configuration manager command, one or more optional arguments, one or more input variables, or any combination thereof.

19. The method of claim 15, wherein the exporting the temporal configuration file to the designated output path triggers an auto-modification process that modifies a version file.

20. The method of claim 15, further comprising:
   reducing a size of the temp folder such that the size of the temp folder does not exceed a maximum size, based at least in part on a number of sections in a version file within the temp folder, a life cycle, the maximum size, or any combination thereof.

* * * * *